United States Patent
Chiussi et al.

(10) Patent No.: US 6,693,913 B1
(45) Date of Patent: Feb. 17, 2004

(54) METHOD AND APPARATUS FOR GUARANTEEING DATA TRANSFER RATES AND DELAYS IN DATA PACKET NETWORKS USING GENERALIZED DISCRETE DATA TRANSFER RATE APPROACH

(75) Inventors: Fabio Massimo Chiussi, Tinton Falls, NJ (US); Andrea Francini, Eatontown, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/247,779

(22) Filed: Feb. 9, 1999

Related U.S. Application Data

(60) Provisional application No. 60/079,647, filed on Mar. 27, 1998.

(51) Int. Cl.[7] .............................................. H04L 12/28
(52) U.S. Cl. ...................................... 370/412; 370/468
(58) Field of Search ................................. 370/412, 413, 370/536, 538, 542, 543, 544, 229, 389, 468, 235; 704/203, 211; 707/10, 104.1, 200

(56) References Cited

U.S. PATENT DOCUMENTS

| | | | | |
|---|---|---|---|---|
| 5,212,687 A | * | 5/1993 | De La Bourdonnaye | ... 370/538 |
| 5,649,050 A | * | 7/1997 | Hardwick et al. | .......... 704/203 |
| 6,072,772 A | * | 6/2000 | Charny et al. | ............... 370/229 |
| 6,295,295 B1 | * | 9/2001 | Wicklund | .................... 370/392 |
| 6,408,005 B1 | * | 6/2002 | Fan et al. | .................... 370/412 |

\* cited by examiner

*Primary Examiner*—Seema S. Rao
*Assistant Examiner*—Melanie Jagannathan

(57) ABSTRACT

A scheduler and method for use in packet communication systems apply a generalized discrete-rate scheduling technique which removes the limitation of the linear increase in sorting complexity with the number of supported service rates. The set of supported service rates may be increased without increasing the number of timestamps that need to be sorted. Conversely, the generalized discrete-rate scheduler supports a given number of service rates using a smaller number of rate FIFO queues, thus further reducing complexity. Such improved performance is achieved by splitting, for scheduling purposes only, a connection or session into multiple sub-connections or sub-sessions. The technique can be applied to per-connection-timestamp and no-per-connection-timestamp discrete-rate schedulers, as well as to any other discrete-rate scheduler.

31 Claims, 6 Drawing Sheets

METHOD AND APPARATUS FOR GUARANTEEING DATA TRANSFER RATES AND DELAYS IN DATA PACKET NETWORKS USING GENERALIZED DISCRETE DATA TRANSFER RATE APPROACH

CROSS-REFERENCE TO RELATED APPLICATIONS

This application is related to co-pending U.S. patent application Ser. No. 60/079,647, filed Mar. 27, 1998, and entitled METHOD AND APPARATUS FOR GUARANTEEING DATA TRANSFER RATES AND DELAYS IN DATA PACKET NETWORKS USING GENERALIZED DISCRETE DATA TRANSFER RATE APPROACH.

This application is also related to a commonly assigned and co-pending U.S. patent application of Fabio Chiussi and Andrea Francini, entitled METHOD AND APPARATUS FOR GUARANTEEING DATA TRANSFER RATES AND DELAYS IN DATA PACKET NETWORKS USING DISCRETE DATA TRANSFER RATES, filed Feb. 9, 1999, now U.S. Pat. No. 6,396,843.

BACKGROUND OF THE INVENTION

The present invention relates to packet communication systems, and in particular to a method and an apparatus for scheduling packets in packet networks for guaranteeing data transfer rates to data sources and data transfer delays from data sources to destinations using a discrete data transfer rate scheduler in which the number of queues serving the data connections is less than the number of discrete data transfer rates supported by the scheduler. This invention can be used in any system for data packet forwarding such as Asynchronous Transfer Mode (ATM) switches and Internet Protocol (IP) routers.

Per-Virtual-Connection (Per-VC) schedulers are known which aim to approximate a Generalized Processor Sharing policy, as described in A. K. Parekh and R. G. Gallager, "A Generalized Processor Sharing Approach to Flow Control in Integrated Services Networks: The Single-Node Case", IEEE/ACM TRANSACTIONS ON NETWORKING, June 1993, pp. 344–357, which is incorporated herein by reference. As defined herein, the term "VC" is used throughout to mean "virtual connection". It is understood that virtual connections may also include virtual circuits and Internet Protocol (IP) flows. Implementation of such Per-VC schedulers is a central issue in next-generation switching systems. In a market arena in which cost targets are precipitously dropping, an important objective is to minimize the complexity involved in Per-VC schedulers, and to minimize the cost differential with respect to switches using less sophisticated scheduling.

As defined herein and throughout, the term "GPS" is an abbreviation for the Generalized Processor Sharing policy, as described in A. K. Parekh et al., supra. GPS-related packet-scheduling disciplines are based on maintaining a global function, referred to by different authors either as a virtual time, such as in A. K. Parekh et al., supra, and in S. J. Golestani, "A Self-Clocked Fair Queuing Scheme for Broadband Applications", PROCEEDINGS OF INFOCOM '94, April 1994, pp. 636–646, which is incorporated herein by reference; or as a system potential, such as described in D. Stiliadis and A. Varma, "Design and Analysis of Frame-based Fair Queuing: A New Traffic Scheduling Algorithm for Packet-Switched Networks", PROCEEDINGS OF SIG-METRICS '96, May 1996, pp. 104–115; and D. Stiliadis and A. Varma, "Efficient Fair Queuing Algorithms for ATM and Packet Networks", TECHNICAL REPORT UCSC-CRL-95-59, December 1995, with each of these references being incorporated herein by reference.

The global function tracks the amount of work that is done by the server to process packets in the communication system. The server uses this global function to compute, for each packet in the system, a timestamp that specifies when the packet should be transmitted relative to other packets. Packets are transmitted by increasing order of their timestamps. The specific function used as system potential determines the delay and fairness properties of each algorithm in the class.

The total implementation cost of these GPS-related scheduling algorithms is the combination of three factors: (i) the complexity of the function used as system potential to compute the timestamps for the packets in the system, (ii) the complexity involved in sorting the timestamps in order to select the packet with a minimum timestamp for transmission, and (iii) the cost of handling and storing the timestamps. In recent years, several scheduling algorithms which use a system-potential function of order $O(1)$ complexity have been introduced. Examples of such algorithms include Self-Clocked Fair Queuing (SCFQ), as described in S. J. Golestani, supra; Frame-based Fair Queuing (FFQ), as described in D. Stiliadis et al., "Design and Analysis of Frame-based Fair Queuing . . . ", supra; Virtual Clock, as described in L. Zhang, "Virtual Clock: A New Traffic Control Algorithm for Packet Switching", ACM TRANSACTIONS ON COMPUTER SYSTEMS, May 1991, pp. 101–124; and Minimum-Delay Self-Clocked Fair Queuing (MD-SCFQ), described in F. M. Chiussi and A. Francini, "Minimum-Delay Self-Clocked Fair Queuing Algorithm for Packet-Switched Networks", PROCEEDINGS OF INFO-COM '98, March 1998, each of which is incorporated herein by reference.

In particular, among these algorithms, MD-SCFQ has both optimal delay properties and excellent fairness properties. Scheduling algorithms achieving a desired performance with a system-potential function of minimal complexity are therefore available, but the total performance cost of the scheduler is still dominated by the complexity of sorting and storing the timestamps.

One well-known simplification in timestamp processing by a scheduler is obtained by assigning increasing values of timestamps to consecutive packets which belong to the same session, so that for each session only the timestamp of the packet at the head of the corresponding packet queue is to be considered and processed in the packet selection process. Such a timestamp is referred to as session timestamp. The number of session timestamps which have to be sorted is therefore equal to the number of sessions V supported by the scheduler. For example, typical values of V in current ATM switches, in which sessions are referred to as VCs, are in the order of tens of thousands of sessions. The range of possible values that the timestamps can assume at any given time depends on the ratio between the maximum and minimum service rates that the scheduler is required to provide to the connections. Such a timestamp range is typically very wide.

In view of the complexity in sorting a large number of timestamps over a wide range of possible values at the high speeds employed in broadband digital networks, hardware implementations of packet switching systems are only affordable by data structures and processor configurations that are specifically devised to be efficiently mapped into silicon on integrated circuits or chips. Even with such specialized structures, the implementation cost may still be too high, and techniques to further reduce complexity are necessary. Different approaches are possible for this purpose. In some cases, the specific properties of a scheduler can help in simplifying the selection process.

Several techniques have been proposed to reduce the cost of the sorting operation. In particular, two approaches are the Logarithmic Calendar Queue (LCQ) introduced in F. M. Chiussi, A. Francini and J. G. Kneuer, "Implementing Fair Queuing in ATM Switches—Part 2: The Logarithmic Calendar Queue", PROCEEDINGS OF GLOBECOM '97, November 1997, pp. 519–525; as well as the discrete-rate scheduler presented in J. C. R. Bennett, D.C. Stephens and H. Zhang, "High Speed, Scalable, and Accurate Implementation of Fair Queuing Algorithms in ATM Networks", PROCEEDINGS OF ICNP '97, October 1997, pp. 7–14, each of which are incorporated herein by reference. Both of these approaches are arguably the two approaches that achieve the highest reduction in the hardware complexity of a GPS-related scheduler with optimal delay properties. In addition, such approaches introduce only a very small degradation in the delay bounds of the scheduler.

The LCQ is an optimized calendar queue which reduces the complexity by increasing, in an optimal manner, the granularity of the bins used to sort the timestamps, so that the relative degradation in delay bounds for each connection is equalized.

The discrete-rate scheduler is a relatively simple structure that can be used when the guaranteed service rates that the scheduler needs to support at any given time only belong to a relatively small set of discrete values. Such operating conditions are certainly realistic in most, if not all, ATM switches. As shown in FIG. 1, the illustrated discrete-rate scheduler 10 is a per-connection-timestamp scheduler having a corresponding timestamp for each of the sessions; for example, the sessions 14–16 in FIG. 1. Each of the sessions 14–16 has a corresponding session controller 71–73 and a corresponding timestamp 22–24, respectively.

Other advantages are known for using a discrete set of rates. In this case, connections with the same service rate are grouped together in common rate First-In-First-Out (FIFO) queues, and scheduling is performed only among the connections at the head of each rate FIFO queue. Accordingly, the per-connection timestamp scheduler 10 in FIG. 1 has the plurality of registers for storing pointers as heads 12 and tails 18 for maintaining the number N of rate FIFO queues 28, with the sessions 14–16 in a given queue having the same rate from among rates $r_1 \ldots r_N$.

Thus, the registers 12 and 18 in Rate FIFO Queue 1 are associated with a common rate $r_1$, with a first head 12 labeled HEAD(1) as a head pointer pointing to sessions in the queue and having an associated timestamp 20 labeled $F_{HEAD(1)}$; a first set of sessions 14–16 having session controllers 71–73 labeled $SC_{1,A}$ and $SC_{1,B}$, respectively, and timestamps 22–24 labeled $F_{1,A}$ and $F_{1,B}$, respectively; and a first tail TAIL(1) 18 as a tail pointer to sessions in the queue and having an associated timestamp 26 labeled $F_{TAIL(1)}$. As described above, scheduling is performed by processing the sessions pointed to at the heads of the queues, with such sessions being processed by a Smallest-Eligible-Finishing-potential-First (SEFF) selector 30 to determine a minimum eligible timestamp for service from among the sessions pointed to by the heads of the queues 28.

The implemented scheduler may have certain properties for the maximum distance between timestamps of different connections having the same rate, and for the relation between system potential and timestamps, as is the case for the worst-case-fair weighted fair queuing system ($WF^2Q$, or alternatively $WF^2Q+$) described in J. C. R. Bennett and H. Zhang, "Hierarchical Packet Fair Queuing Algorithms", PROCEEDINGS OF SIGCOMM '96, August 1996, pp. 143–156; and other worst-case-fair schedulers, such as described in D. Stiliadis and A. Varma, "A General Methodology for Designing Efficient Traffic Scheduling and Shaping Algorithms", PROCEEDINGS OF INFOCOM '97, April 1997, with each of these articles being incorporated herein by reference.

The number of timestamps to be sorted is greatly reduced, for example, to be equal to the number of supported rates, and therefore the complexity of the sorting task is considerably decreased.

Other possible scheduling techniques may be implemented. For example, in the no-per-connection-timestamp scheduler 32 of FIG. 2, the sessions are maintained in queues 38 to be selectively serviced by a SEFF selector 54. Each of the rate FIFO queues 38 is treated as a single macro-session, such that the queues 38 form a set of macro-sessions 56–60. Accordingly, for a given rate FIFO queue such as the queue having the timestamp 42 and the head 48, the macro-session 56 has the head 48 and tail 62 and includes the queued sessions 64–66, having associated session controllers 73–75, with the timestamp 42 being associated with the entire queue and the entire macro-session 56.

A limitation of existing discrete-rate schedulers is that the associated complexity increases linearly with the number of rates, and therefore this approach is attractive only for relatively small numbers of rates, such as 32 or 64 rates, which may be excessively restrictive to the performance of the scheduler. In fact, in order to take advantage of the reduced number of elements to be sorted, sorting is to be performed by linear search, which further restricts the performance of the scheduler.

SUMMARY

It is an object of the present invention to provide a technique to perform as a generalized discrete-rate scheduler to remove the limitation of existing discrete-rate schedulers due to the linear increase in sorting complexity with the number of rates, and to further reduce the implementation cost of such a scheduler. Using such a generalized discrete-rate scheduler, a given number of rate FIFO queues is able to support a larger number of guaranteed rates. Each rate FIFO queue accommodates connections with a certain basic guaranteed service rate, as well as connections with guaranteed service rates that are multiples of the associated basic rate. Connections having a service rate which does not correspond to a basic rate are split into sub-sessions or sub-connections of equal rate, with such splitting performed for scheduling purpose only. Accordingly, the splitting does not affect the connections in any way except to improve the processing of the connections.

With this method, the set of supported service rates may be increased without increasing the number of timestamps to be sorted. Conversely, for a given number of service rates that have to be supported, the associated processing complexity is reduced by using a smaller number of rate FIFO queues. The effects on the delay bounds is minimal, and is only experienced by those connections having rates that are not basic rates. The technique can be applied to per-connection timestamp and no-per-connection-timestamp schedulers, as well as to any discrete-rate scheduler.

The present invention relates to a method and an apparatus for scheduling packets in packet networks for guaranteeing data transfer rates to data sources and data transfer delays from data sources to destinations using a discrete data transfer rate scheduler where the number of queues serving the data connections is lower than the number of discrete data transfer rates supported by the scheduler.

DETAILED DESCRIPTION OF THE PREFERRED EMBODIMENT

Referring now to FIGS. 3–6, the present invention relates to a method and apparatus implementing a technique for removing the limitation of a discrete-rate scheduler due to the linear increase in sorting complexity with the number of rates and further reduce the implementation cost of such a scheduler. In the illustrative embodiments, the present invention is applied to reduce the implementation complexity for a GPS-related scheduler in an ATM network, but it is to be understood that the present invention can be applied to reduce the implementation complexity for any GPS-related scheduler in any packet network.

The present invention is a Generalized-Discrete-Rate scheduler and method of use which does not have the limitation of existing discrete-rate schedulers due to the linear increase in complexity of the sorting structure with the number of rates. Thus, the Generalized-Discrete-Rate scheduler and method is not limited to a relatively small number of rates, of the order of 32 or 64, as are existing discrete-rate schedulers.

The present invention permits the support of a number of guaranteed service rates which is larger than the number of rate FIFO queues at the cost of a small degradation in terms of delay guarantees. Conversely, given a desired number of rates to be supported, a smaller number of rate FIFO queues can be used. The present invention can be used with any discrete-rate scheduler, including existing discrete-rate schedulers with per-connection timestamps, such as the scheduler described above and schematically shown in FIG. 1, as well as the no-per-connection-timestamp discrete-rate scheduler, schematically shown in FIG. 2 and described in greater detail in a commonly assigned U.S. patent application of Fabio Chiussi and Andrea Francini, entitled METHOD AND APPARATUS FOR GUARANTEEING DATA TRANSFER RATES AND DELAYS IN DATA PACKET NETWORKS USING DISCRETE DATA TRANSFER RATES, filed Feb. 9, 1999, now U.S. Pat. No. 6,396,843, which is incorporated herein by reference.

Figure 1:
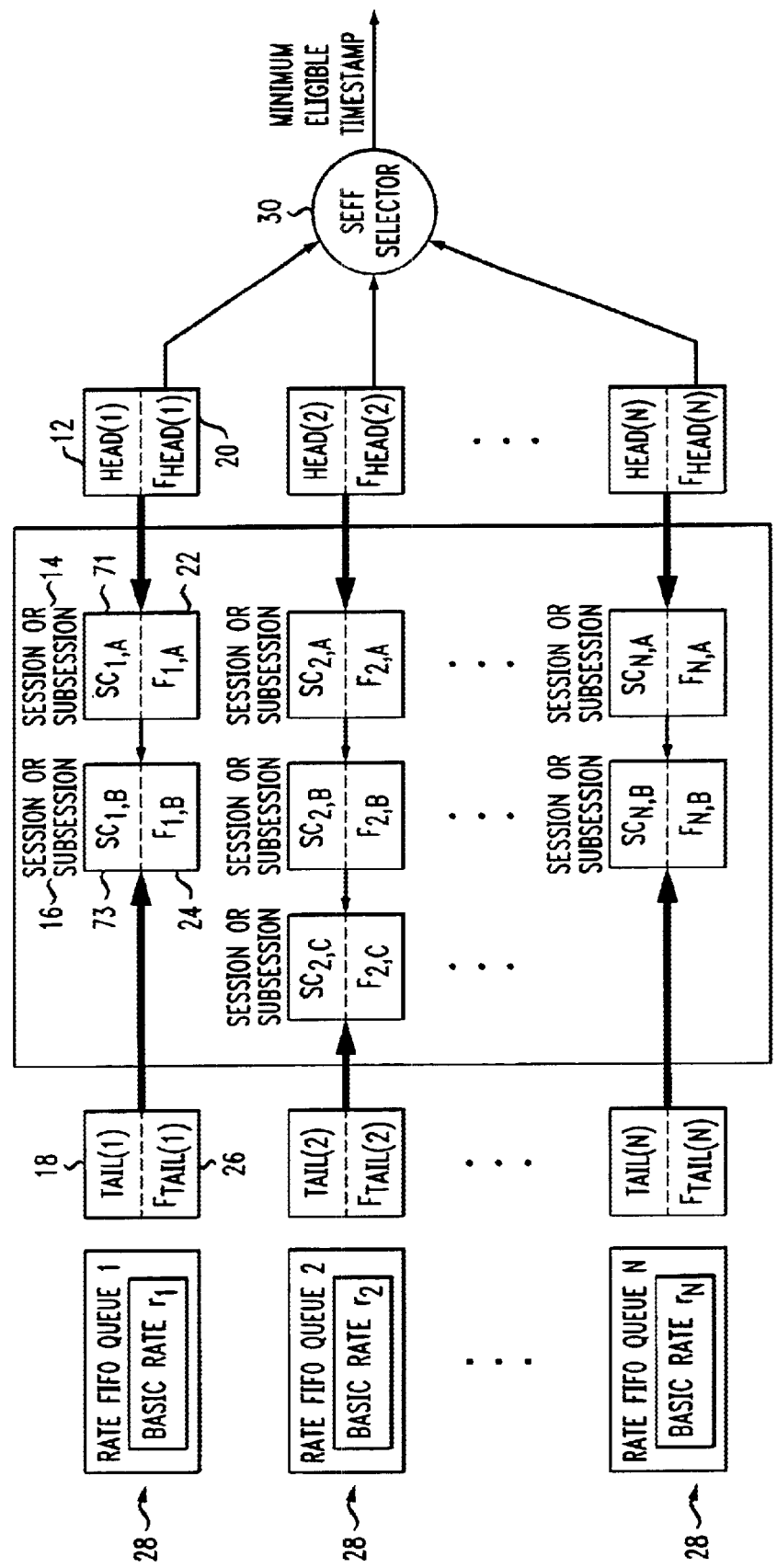
FIG. 1 illustrates a per-connection-timestamp discrete-rate scheduler.
Figure 2:
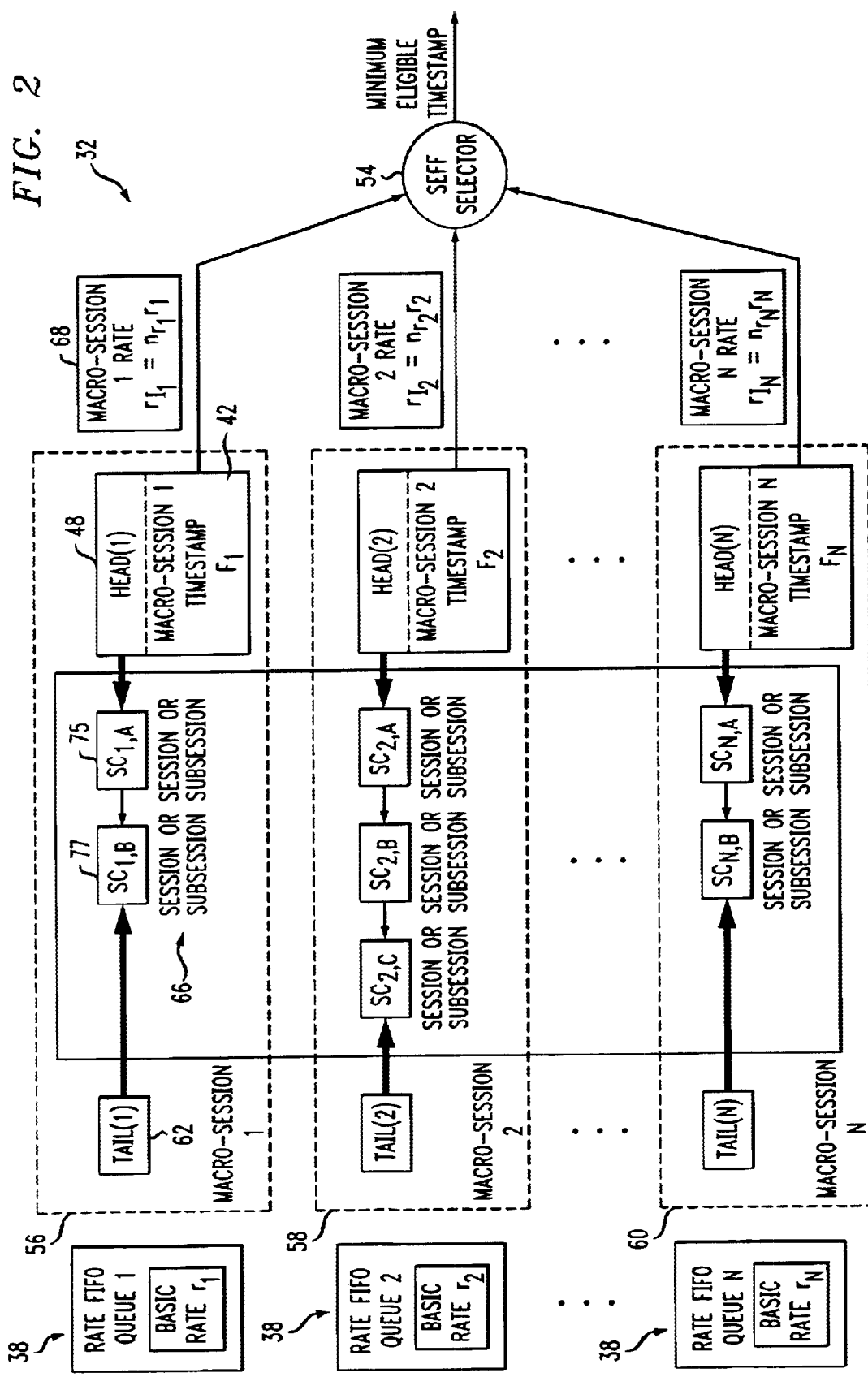
FIG. 2 illustrates a no-per-connection-timestamp discrete-rate scheduler.
Figure 5:
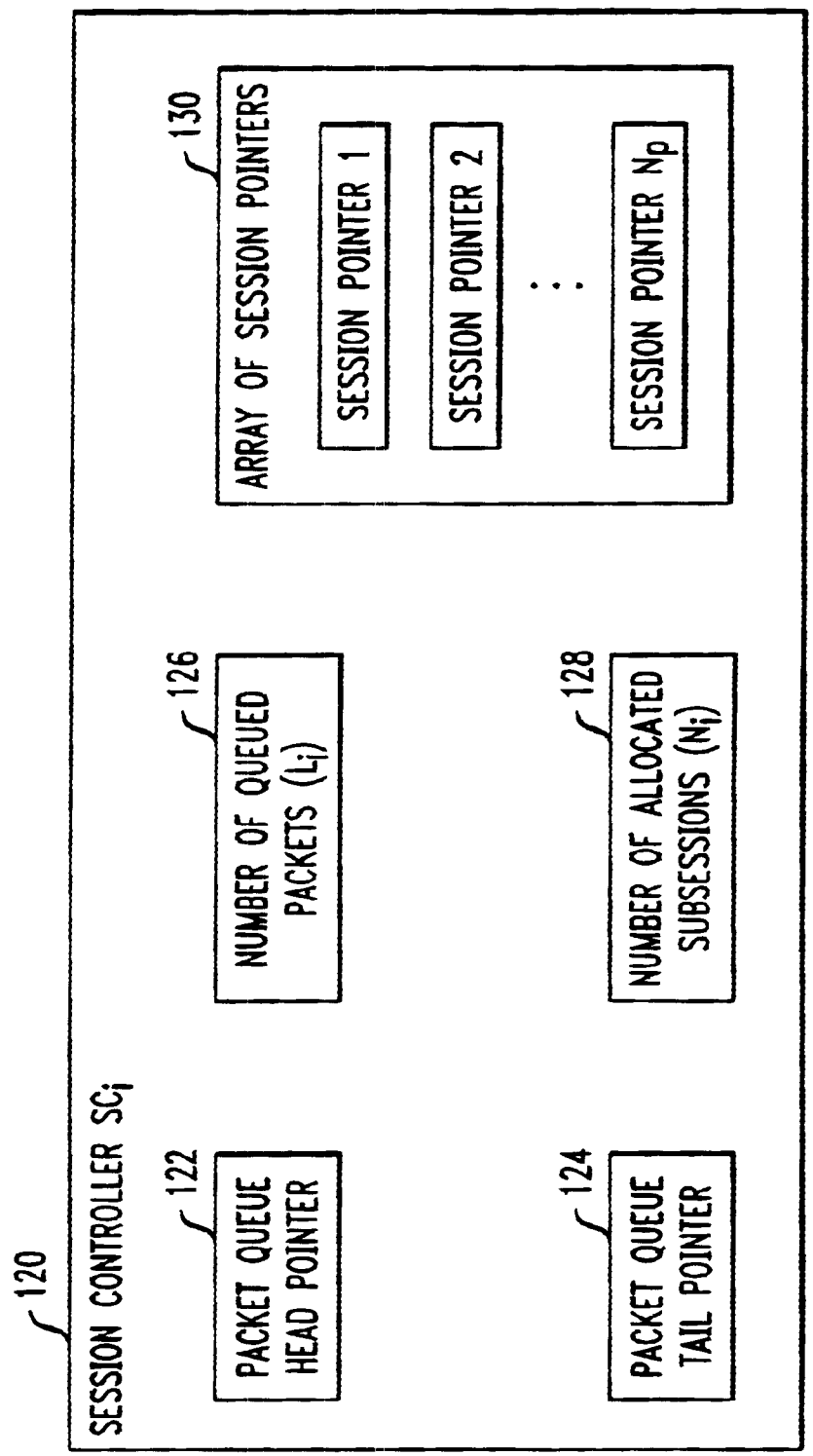
FIG. 5 illustrates a session controller.

The Generalized-Discrete-Rate scheduler and method of the present invention is implemented in the session controllers 120 of FIG. 5, associated with the sessions 14–16 of FIG. 1 and with the sessions 64–66 of FIG. 2, to control the processing of sessions into the rate FIFO queues 28, 38, respectively.

Figure 3:
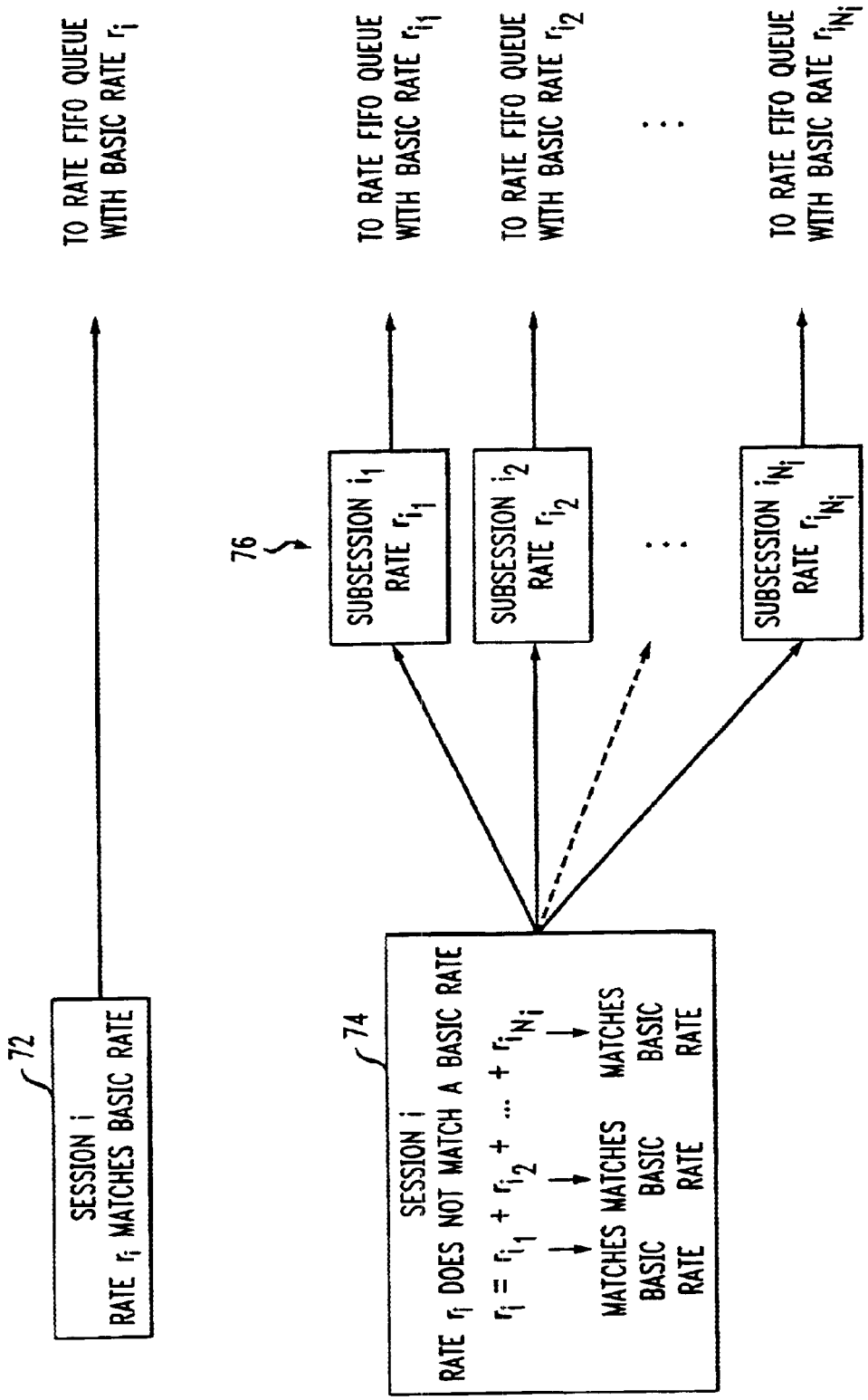
FIG. 3 illustrates a schema for assigning sessions and sub-sessions to rate FIFO queues.

Referring to the present invention shown in FIGS. 3–6, $N_r$ service rates are supported, while the implementation is based on $N_g$ rate FIFO queues, with $N_g < N_r$. Each rate FIFO queue is associated with a basic service rate from among the $N_g$ basic service rates. Referring to FIG. 3, a session i as in box 72, having a service rate $r_i$ matching one of the basic service rates, is queued in the corresponding rate FIFO queue with the basic rate $r_i$, and treated accordingly by the discrete-rate scheduler, such as either of the schedulers shown in FIGS. 1–2. However, a session i as in box 74, having a service rate $r_i$ which does not directly match any of the basic rates, is split into $N_i$ sub-sessions $i_j$, as sub-sessions 76 in FIG. 3, of equal rate $r_{i_j} = r_i/N_i$, with $1 \leq j \leq N_i$ and $N_i \leq N_p$, in which the rate $r_{i_j}$ of the sub-sessions 76 matches a basic rate and $N_p$ is the number of session pointers that are available in each of the session controllers 120 illustrated in FIG. 5.

The sub-session rates $r_{i_1}, r_{i_2}, \ldots r_{i_{N_i}}$ are equal; that is:

$$r_{i_1} = r_{i_2} = r_{i_{N_i}} = \frac{r_i}{N_i} \tag{2}$$

and so, as shown in FIG. 3:

$$r_i = r_{i_1} + r_{i_2} + \ldots + r_{i_{N_i}} \tag{3}$$

Figure 4:
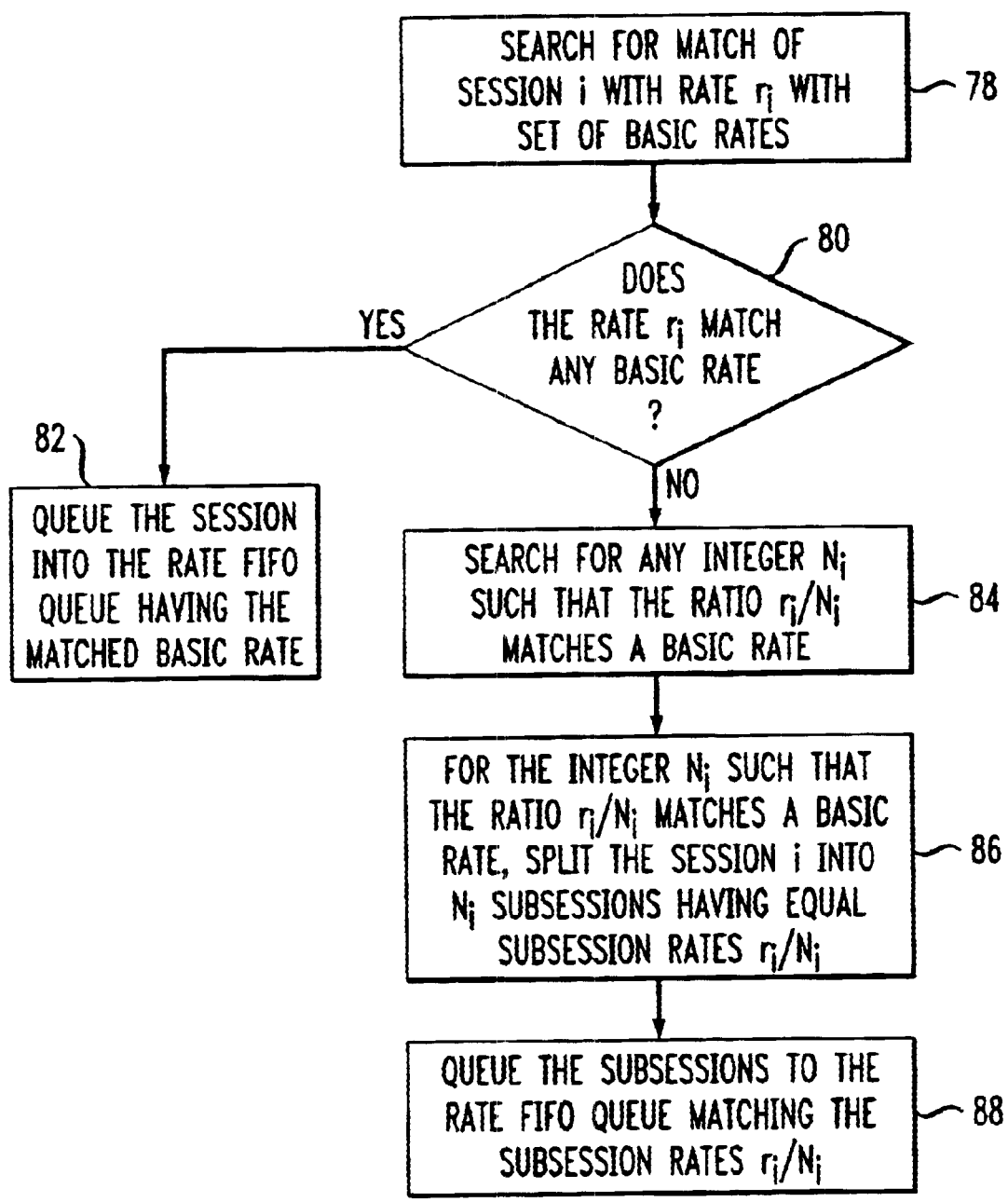
FIG. 4 illustrates a method implementing the schema of FIG. 3.

The sub-sessions 76 are then associated with the rate FIFO queue having the basic rate $r_{i_{N_i}}$. As shown in FIG. 4, the set-up procedure for a newly established session i includes the steps of: searching in step 78 for a match of session i having rate $r_i$ with the set of basic rates, and determining in step 80 whether the rate $r_i$ matches any basic rate. If there is a match in step 80, then the method associates the session in step 82 with the rate FIFO queue having the matched basic rate, so that the session is serviced by the schedulers in FIGS. 1–2 as in the known manner.

Otherwise, if there is no detected match in step 80 to any basic rate, then the method searches in step 84 for an integer number $N_i \leq N_p$ such that $r_i/N_i$ is one of the $N_g$ basic service rates. For that matched rate, the method splits the session i into $N_i$ sub-sessions having equal sub-session rates $r_i/N_i$ in step 86, and then associates the sub-sessions with the rate FIFO queue having the matching basic rate $r_i/N_i$ in step 88.

There are some constraints on $N_r$, the number of service rates that can belong to the complete set of supported service rates, since $N_r - N_g$ rates have to be multiples of other rates. However, with 32 or 64 basic rates, the freedom in the possible combinations of rates that can be supported is quite large.

Referring to FIG. 5, a session controller 120 associated with a session i includes: a pointer 122 to the head of the packet queue of session i; a pointer 124 to the tail of the packet queue for session i; a register 128 with the number of sub-sessions configured for session i; and an array 130 of $N_p$ session pointers used to queue the sub-sessions of session i into the corresponding rate FIFO queue ($N_p \geq N_i$).

At most $N_i$ entries corresponding to the sub-sessions of session i can be in the rate FIFO queue of basic rate $r_i/N_i$ at any time. The proper number of entries in the rate FIFO queue is managed by the session controller 120 with respect to the length $L_i$ of the queue of packets corresponding to session i as described below with reference to FIG. 6.

Figure 6:
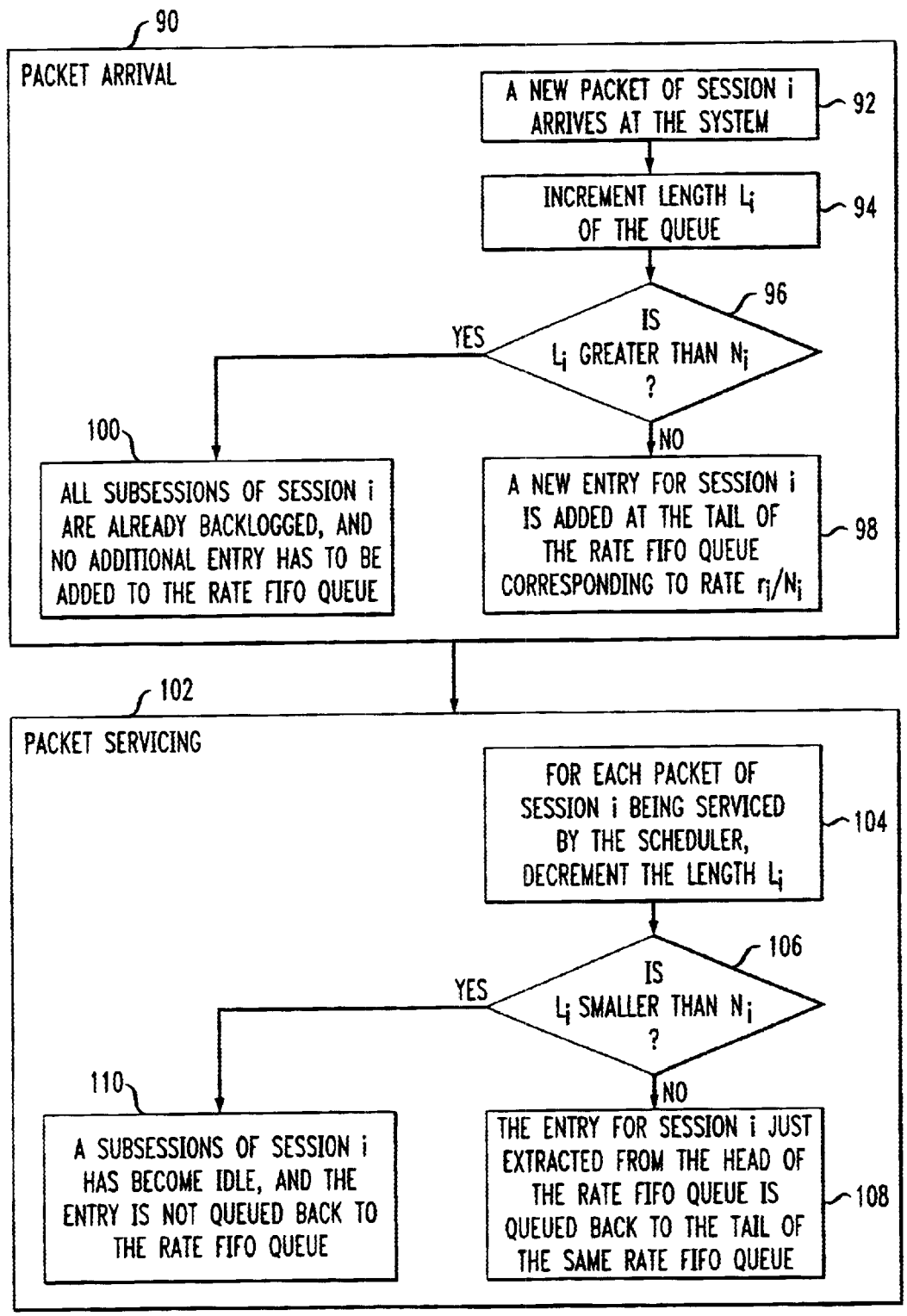
FIG. 6 illustrates a method for processing sessions at packet arrivals and departures.

As shown in FIG. 6, with reference to packet arrival in step 90, every time a new packet of session i arrives at the system in step 92, the length $L_i$ of counter 126 is incremented in step 94. Then, if $L_i$ is not greater than $N_i$, as determined in step 96, a new entry for session i is added at the tail of the rate FIFO queue corresponding to rate $r_i/N_i$ in step 98, and the $L_i$-th session pointer in the session-pointer array 130 is used to link the entry of session i to the next session eventually appended to the tail of the same rate FIFO queue. Otherwise, all sub-sessions of session i are classified as already backlogged in step 100, and no additional entry has to be added to the rate FIFO queue.

Every time a packet of session i is serviced by the scheduler in step 102, the content $L_i$ of the counter 126 is decremented in step 104. Then, if $L_i$ is not smaller than the content $N_i$ of the register 128, as determined in step 106, the entry for session i just extracted from the head of the rate FIFO queue is queued back, in step 108, to the tail of the same rate FIFO queue. Otherwise, a sub-session of session i is classified as idle in step 110, and the entry is not queued back to the rate FIFO queue.

After packet arrival in step 90, packet servicing is performed in step 102, so that every time a packet of session i is serviced by the scheduler the length $L_i$ is decremented in step 104. Then, if $L_i$ is not smaller than $N_i$, as determined in step 106, the entry for session i just extracted from the head of the rate FIFO queue is queued back, in step 108, to the tail of the same rate FIFO queue. Otherwise, a sub-session of session i has become idle in step 110, and the extracted entry is not queued back to the rate FIFO queue.

The session i is split in multiple sub-sessions for scheduling purpose only, and so the processing and servicing of session i is not affected in any other way. One difference compared to the case in which sessions are not split is that more than one entry in the corresponding rate FIFO queue may be pointing at session i. Such session management operates particularly well in the case of the no-per-connection-timestamp scheduler shown in FIG. 2, because there is no need to maintain a timestamp for each sub-session. In the case of the discrete-rate scheduler with per-connection timestamps shown in FIG. 1, a timestamp for each sub-session is required to be maintained.

The following delay bound $D_i^{nts}(N_i)$, in which "nts" stands for "no timestamp", holds for a $(b_i, r_i)$-leaky-bucket-constrained session i that is split in $N_i$ sub-sessions with service rate $r_i/N_i$ in the no-per-connection-timestamp scheduler:

$$D_i^{nts}(N_i) < \frac{b_i + 1}{r_i} + \frac{5N_i}{4r_i} \quad (1)$$

in which $b_i$ is a bucket size in a $(b_i, r_i)$-leaky-bucket-constrained session i.

Also, the following delay bound $D_i^{wts}(N_i)$, in which "wts" stands for "with timestamp", holds for the same session in the discrete-rate scheduler with per-connection timestamps:

$$D_i^{wts}(N_i) < \frac{b_i + 1}{r_i} + \frac{2N_i}{r_i} \quad (2)$$

Comparing these delay bounds with the respective bounds in each scheduler when session i is not split, the only effect of dividing session i into $N_i$ sub-sessions is the increment of its worst-case delay by no more than $$\frac{5N_i}{4r_i}$$

in the case of the no-per-connection-timestamp scheduler in FIG. 2, and by no more than $2N_i/r_i$ in the case of the discrete-rate scheduler with per-connection timestamps in FIG. 1. This degradation is a consequence of the increase in latency that is experienced by the sub-sessions due to their reduced service rate.

By the foregoing a novel and unobvious scheduler and method has been disclosed by way of the preferred embodiment. However, numerous modifications and substitutions may be had without departing from the spirit of the invention. For example, while the preferred embodiment discusses an ATM scheduler, it is wholly within the purview of the invention to contemplate applying the session splitting and sub-session processing in the manner as set forth above to other packet network systems. Accordingly, the invention has been described by way of illustration rather than limitation.

What is claimed is:

1. A method for servicing, at a predetermined service rate, a plurality of queues containing data packets, each of the queues being associated with a respective one of a plurality of connections, each of the connections traversing an associated communication switch, each of the connections being allocated a respective data transfer rate, the method comprising the steps of:

responsive to receiving a request for establishing a new connection, determining whether the data transfer rate requested for the new connection matches one of a finite and discrete plurality of basic data transfer rates;

responsive to a match of the data transfer rate requested for the new connection with one of the available basic data transfer rates, associating the new connection with the matched basic data transfer rate;

responsive to a non-match of the data transfer rate requested for the new connection with any of the available basic data transfer rates, splitting the new connection into a plurality of sub-connections, the allocated rate of each of the sub-connections matching one of the basic data transfer rates, and associating each of the sub-connections with the respective matched basic data transfer rate;

responsive to receiving a plurality of data packets via a plurality of data links, identifying for each received data packet the respective one of the allocated connections and identifying the one of the queues associated with the connection;

storing each of the received data packets in the corresponding identified queue;

responsive to storing each received data packet in a queue associated with one of those connections whose data transfer rate matches one of the available basic data transfer rates, determining whether the connection was previously idle and must be activated, and identifying the connection as an active connection;

responsive to storing a received data packet in a queue associated with one of those connections whose data transfer rate does not mach any of the available basic data transfer rates, in which the connection is identified as a split connection, determining whether a previously idle sub-connection must be activated for the split connection, and identifying the sub-connection as an active sub-connection;

responsive to the activation of a previously idle sub-connection, treating the sub-connection as an independent entity for the purpose of service distribution, the service distribution being regulated by a scheduling method capable of supporting the finite and discrete plurality of basic data transfer rates;

scheduling the transmission of stored data packets on the available outputs according to the data transfer rates associated with respective ones of the allocated connections and sub-connections;

responsive to the transmission of a data packet from a queue associated with one of those connections whose data transfer rate matches one of the available basic data transfer rates to an output, determining whether the queue associated with the connection has at least one more packet waiting therein, in which the connection is identified as an active connection, or whether the queue associated with the connection has no packets waiting therein, in which the connection is identified as an idle connection; and responsive to the transmission of a data packet from a queue associated with one of those connections whose data transfer rate does not match any of the available basic data transfer rates to an output, updating the state of the packet queue associated with the allocated split connection, and determining whether one of the currently active sub-connections of the allocated split connection must be deactivated, in which the deactivated sub-connection is identified as an idle sub-connection.

2. The method of claim 1, wherein the step of splitting a connection generates a plurality of sub-connections whose data transfer rates are all equal and matching one of the available basic data transfer rates.

3. The method of claim 1, further comprising the steps of:

activating a previously idle sub-connection for a connection whose data transfer rate does not match any of the available basic data transfer rates when a new packet is stored in the queue associated with the split connection and the number of packets currently stored in the queue is smaller than the total number of currently active sub-connections associated with the split connection, in which the activated sub-connection is identified as an active sub-connection; and deactivating a previously active sub-connection for a connection whose data transfer rate does not match any of the available basic data transfer rates when a packet is transmitted to an output from the queue associated with the split connection and the number of packets remaining in the queue after the transmission is completed is smaller than the total number of currently active sub-connections associated with the split connection, in which the deactivated sub-connection is identified as an idle sub-connection.

4. The method of claim 1, wherein a macro-queue of connections and sub-connections is associated with each of the plurality of basic data transfer rates, the macro-queue being used to store active connections and active sub-connections whose associated data transfer rate matches the one of the available basic data transfer rates; and wherein the method further comprises the steps of:

appending a connection or sub-connection to the tail of the associated macro-queue when the connection or sub-connection becomes active after being idle, in which a connection is identified as idle when the connection has no data packets waiting for transmission in its respective packet queue, and is identified as active when the packet queue contains at least one data packet, and in which a sub-connection is identified as idle when it has been deactivated, and is identified as active when it has been activated;

associating a timestamp with each of the macro-queues;

generating a new timestamp associated with a macro-queue each time a new active connection or sub-connection reaches the head of the macro-queue, wherein a system potential is used in the generation of the new timestamp;

associating a cumulative service rate with each of the macro-queues, the cumulative service rate being used to generate the respective timestamp associated with each of the macro-queues;

generating a value for the system potential according to a predetermined function; and selecting one of the timestamps associated with the macro-queues which have at least one active connection or sub-connection waiting for service therein, and identifying the active connection or sub-connection at the head of the macro-queue associated with the selected timestamp as the recipient of the next service, the service including the steps of:

removing a data packet from the head of the queue associated with the identified active connection or with the split connection associated with the identified active sub-connection;

transmitting the removed data packet to an output;

removing the identified active connection or sub-connection front the head of the macro-queue associated with the selected timestamp; and appending again the identified connection or sub-connection to the tail of the same macro-queue only if the identified connection or sub-connection remains active after the packet has been removed.

5. The method of claim 4, wherein the selection of the timestamp identifying an active connection or sub-connection as the recipient of a service is based on a Smallest-Finishing-potential-First (SFF) timestamp selection policy, wherein a timestamp is selected when its value is minimum among all timestamps associated with non-empty macro-queues.

6. The method of claim 4, wherein the selection of the timestamp identifying an active connection or sub-connection as the recipient of a service is based on a Smallest-Eligible-Finishing-potential-First (SEFF) timestamp selection policy, wherein a timestamp is selected when its value is minimum among all timestamps being associated with non-empty macro-queues and not exceeding the system potential by more than a fixed amount, the amount being specific of each timestamp.

7. The method of claim 4, wherein the cumulative rate associated with each macro-queue is equal to the basic data transfer rate associated with the macro-queue multiplied by the number of allocated connections and sub-connections associated with the macro-queue.

8. The method of claim 4, wherein the timestamp associated with a macro-queue, generated each time a new active connection or sub connection reaches the head of the macro-queue, is generated as a maximum value between a previous value of the timestamp assigned to the macro-queue and a current value of the system potential, the maximum value incremented by the inverse of the cumulative data transfer rate associated with the macro-queue, if the macro-queue is empty before its head is reached by the new active connection or sub-connection.

9. The method of claim 4, further comprising the steps of:

activating a previously idle sub-connection for a connection whose data transfer rate does not match any of the available basic data transfer rates when a new packet is stored in the queue associated with the split connection and the number of packets currently stored in the queue is smaller than the total number of currently active sub-connections associated with the split connection, in which the activated sub-connection is identified as an active sub-connection; and deactivating a previously active sub-connection for a connection whose data transfer rate does not match any of the available basic data transfer rates when a packet is transmitted to an output from the queue associated with the split connection and the number of packets remaining in the queue after the transmission is completed is smaller than the total number of currently active sub-connections associated with the split connection, in which the deactivated sub-connection is identified as an idle sub-connection.

10. The method of claim 1, wherein a macro-queue of connections and sub-connections is associated with each of the plurality of basic data transfer rates, the macro-queue being used to store active connections and sub-connections whose associated data transfer rate matches the one of the available basic data transfer rates; and wherein the method further comprises the steps of:

appending a connection or sub-connection to the tail of the associated macro-queue when the connection or sub-connection becomes active after being idle, in which a connection is identified as idle when it has no data packets waiting for transmission in its respective packet queue, and is identified as active when the packet queue contains at least one data packet, and in which a sub-connection is identified as idle when it has been deactivated, and is identified as active when it has been activated;

associating a timestamp with each of the active connections and sub-connections;

generating a new timestamp associated with one of the active connections and sub-connections each time the active connection or sub-connection is appended to the tail of the associated macro-queue, wherein a system potential is used in the generation of the new timestamp;

associating a timestamp with each macro-queue that contains at least one active connection or sub-connection, the timestamp being the one associated with the active connection or sub-connection currently located at the head of the macro-queue;

using the basic data transfer rate associated with each of the macro-queues to generate the timestamps associated with the respective connections and sub-connections;

generating a value for the system potential according to a predetermined function; and selecting one of the timestamps associated with those of the macro-queues which have at least one active connection or sub-connection waiting for service therein, and identifying the active connection or sub-connection at the head of the macro-queue associated with the selected timestamp as the recipient of the next service, the service including the steps of:

removing a data packet from the head of the queue associated with the identified active connection or with the split connection associated with the identified active sub-connection;

transmitting the removed data packet to an output;

removing the identified active connection or sub-connection from the head of the macro-queue associated with the selected timestamp; and appending again the identified connection or sub-connection to the tail of the same macro-queue only if the identified connection or sub-connection remains active after the packet has been removed.

11. The method of claim 10, wherein the selection of the timestamp identifying an active connection or sub-connection as the recipient of a service is based on a Smallest-Finishing-potential-First (SFF) timestamp selection policy, wherein a timestamp is selected when its value is minimum among all timestamps associated with non-empty macro-queues.

12. The method of claim 10, wherein the selection of the timestamp identifying an active connection or sub-connection as the recipient of a service is based on a Smallest-Eligible-Finishing-potential-First (SEFF) timestamp selection policy, wherein a timestamp is selected when its value is minimum among all timestamps being associated with non-empty macro-queues and not exceeding the system potential by more than a fixed amount, the amount being specific of each timestamp.

13. The method of claim 10, wherein the timestamp associated with a connection or sub-connection, generated each time the connection or sub-connection is queued to the respective macro-queue, is generated as a maximum value between a previous value of the timestamp assigned to the connection or sub-connection and a current value of the system potential, the maximum value incremented by the inverse of the data transfer rate associated with the macro-queue, if the connection or sub-connection is not active before being queued to the macro-queue.

14. The method of claim 10, further comprising the steps of:

activating a previously idle sub-connection for a connection whose data transfer rate does not match any of the available basic data transfer rates when a new packet is stored in the queue associated with the split connection and the number of packets currently stored in the queue is smaller than the total number of currently active sub-connections associated with the split connection, in which the activated sub-connection is identified as an active sub-connection; and deactivating a previously active sub-connection for a connection whose data transfer rate does not match any of the available basic data transfer rates when a packet is transmitted to an output from the queue associated with the split connection and the number of packets remaining in the queue after the transmission is completed is smaller than the total number of currently active sub-connections associated with the split connection, in which the deactivated sub-connection is identified as an idle sub-connection.

15. A system for servicing, at a predetermined service rate, a plurality of queues containing data packets, each of the queues being associated with a respective one of a plurality of connections, each of the connections traversing an associated communication switch, each of the connections being allocated a respective data transfer rate, the system comprising:

means, responsive to receiving a request for establishing a new connection, for determining whether the data transfer rate requested for the new connection matches one of a finite and discrete plurality of basic data transfer rates;

means, responsive to a match of the data transfer rate requested for the new connection with one of the available basic data transfer rates, for associating the new connection with the matched basic data transfer rate;

means, responsive to a non-match of the data transfer rate requested for the new connection with any of the available basic data transfer rates, for splitting the new connection into a plurality of sub-connections, the data transfer rate of each of the sub-connections matching one of the basic data transfer rates, and associating each of the sub-connections with the respective matched basic data transfer rate;

means, responsive to receiving a plurality of data packets via a plurality of data links, for identifying for each received data packet the respective one of the allocated connections and identifying the one of the queues associated with the connection;

means for storing each of the received data packets in the corresponding identified queue;

means, responsive to storing each received data packet in a queue associated with one of those connections whose data transfer rate matches one of the available basic data transfer rates, for determining whether the connection was previously idle and must be activated, and for identifying the connection as an active connection;

means, responsive to storing a received data packet in a queue associated with one of those connections whose data transfer rate does not match any of the available basic data transfer rates, in which the connection is identified as a slit connection, for determining whether a previously idle sub-connection must be activated for the split connection, and for identifying the activated sub-connection as an active sub-connection;

means for scheduling the transmission of stored data packets on the available outputs according to the data transfer rates associated with respective ones of the allocated connections and sub-connections;

means, responsive to the transmission of a data packet from a queue associated with one of those connections whose data transfer rate matches one of the available basic data transfer rates to an output, for determining whether the queue associated with the connection has at least one more packet waiting therein, in which the connection is identified as an active connection, or whether the queue associated with the connection has no packets waiting therein, in which the connection is identified as an idle connection; and means, responsive to the transmission of a data packet from a queue associated with one of those connections whose data transfer rate does not match any of the available basic data transfer rates to an output, for updating the state of the packet queue associated with the allocated split connection, and for determining whether one of the currently active sub-connections of the allocated split connection must be deactivated, in which the sub-connection is identified as an idle sub-connection.

16. The system of claim 15, wherein the means for splitting a connection generates a plurality of sub-connections whose data transfer rates are all equal and matching one of the available basic data transfer rates.

17. The system of claim 15, further comprising:

means for activating a previously idle sub-connection for a connection whose data transfer rate does not match any of the available basic data transfer rates when a new packet is stored in the queue associated with the split connection and the number of packets currently stored in the queue is smaller than the total number of currently active sub-connections associated with the split connection, in which the activated sub-connection is identified as an active sub-connection; and means for deactivating a previously active sub-connection for a connection whose data transfer rate does not match any of the available basic data transfer rates when a packet is transmitted to an output from the queue associated with the split connection and the number of packets remaining in the queue after the transmission is completed is smaller than the total number of currently active sub-connections associated with the split connection, in which the deactivated sub-connection is identified as an idle sub-connection.

18. The system of claim 15, further comprising:

a macro-queue for storing connections and sub-connections associated with each of the plurality of basic data transfer rates, the macro-queue used to store active connections and sub-connections whose associated data transfer rate matches the one of the available basic data transfer rates;

means for appending a connection or sub-connection to the tail of the associated macro-queue when the connection or sub-connection becomes active after being idle, in which a connection is identified as idle when the connection has no data packets waiting for transmission in its respective packet queue, and is identified as active when the packet queue contains at least one data packet, and in which a sub-connection is identified as idle when it has been deactivated, and is identified as active when it has been activated;

means for associating a timestamp with each of the macro-queues;

means for generating a new timestamp associated with a macro-queue each time a new active connection or sub-connection reaches the head of the macro-queue, wherein a system potential is used in the generation of the new timestamp;

means for associating a cumulative service rate with each of the macro-queues, the cumulative service rate being used to generate the respective timestamp associated with each of the macro-queues;

means for generating a value for the system potential according to a predetermined function; and means for selecting one of the timestamps associated with the macro-queues which have at least one active connection or sub connection waiting for service therein, and for identifying the active connection or sub-connection at the head of the macro-queue associated with the selected timestamp as the recipient of the next service, the service including the steps of:

removing a data packet from the head of the queue associated with the identified active connection or with the split connection associated with the identified active sub-connection;

transmitting the removed data packet to an output;

removing the identified active connection or sub-connection from the head of the macro-queue associated with the selected timestamp; and appending again the identified connection or sub-connection to the tail of the same macro-queue only if the identified connection or sub-connection remains active after the packet has been removed.

19. The system of claim 18, wherein the means for selecting the timestamp that identifies an active connection or sub-connection as the recipient of a service is based on a Smallest-Finishing-potential-First (SFF) timestamp selection policy, wherein a timestamp is selected when its value is minimum among all timestamps associated with non-empty macro-queues.

20. The system of claim 18, wherein the means for selecting the timestamp that identifies an active connection or sub-connection as the recipient of a service is based on a Smallest-Eligible-Finishing-potential-First (SEFF) timestamp selection policy, wherein a timestamp is selected when its value is minimum among all timestamps being associated with non-empty macro-queues and not exceeding the system potential by more than a fixed amount, the amount being specific of each timestamp.

21. The system of claim 18, wherein the cumulative rate associated with each macro-queue is equal to the basic data transfer rate associated with the macro-queue multiplied by the number of allocated connections and sub-connections associated with the macro-queue.

22. The system of claim 18, wherein the timestamp associated with a macro-queue generated each time a new active connection or sub-connection reaches the head of the macro-queue, is generated as a maximum value between a previous value of the timestamp assigned to the macro-queue and a current value of the system potential, the maximum value incremented by the inverse of the cumulative data transfer rate associated with the macro-queue, if the macro-queue is empty before its head is reached by the new active connection or sub-connection.

23. The system of claim 18, further comprising:
means for activating a previously idle sub-connection for a connection whose data transfer rate does not match any of the available basic data transfer rates when a new packet is stored in the queue associated with the split connection and the number of packets currently stored in the queue is smaller than the total number of currently active sub-connections associated with the split connection, in which the activated sub-connection is identified as an active sub-connection; and
means for deactivating a previously active sub-connection for a connection whose data transfer rate does not match any of the available basic data transfer rates when a packet is transmitted to an output from the queue associated with the split connection and the number of packets remaining in the queue after the transmission is completed is smaller than the total number of currently active sub-connections associated with the split connection, in which the deactivated sub-connection is identified as an idle sub-connection.

24. The system of claim 15, wherein a macro-queue of connections and sub-connections is associated with each of the plurality of basic data transfer rates, the macro-queue being used to store active connections and sub-connections whose associated data transfer rate matches the one of the available basic data transfer rates; and
wherein the system further comprises:
means for appending a connection or sub-connection to the tail of the associated macro-queue when the connection or sub-connection becomes active after being idle, in which a connection is identified as idle when it has no data packets waiting for transmission in its respective packet queue, and is identified as active when the packet queue contains at least one data packet, and in which a sub-connection is identified as idle when it has been deactivated, and is identified as active when it has been activated;
means for associating a timestamp with each of the active connections and sub-connections;
means for generating a new timestamp associated with one of the active connections and sub-connections each time the active connection or sub-connection is appended to the tail of the associated macro-queue, wherein a system potential is used in the generation of the new timestamp;
means for associating a timestamp with each macro-queue that contains at least one active connection or sub-connection, the timestamp being the one associated with the active connection or sub-connection currently located at the head of the macro-queue;
means for using the basic data transfer rate associated with each of the macro-queues to generate the timestamps associated with the respective connections and sub-connections;
means for generating a value for the system potential according to a predetermined function; and
means for selecting one of the timestamps associated with those of the macro-queues which have at least one active connection or sub-connection waiting for service therein, and identifying the active connection or sub-connection at the head of the macro-queue associated with the selected timestamp as the recipient of the next service, the service including the steps of.
removing a data packet from the head of the queue associated with the identified active connection or with the split connection associated with the identified active sub-connection;
transmitting the removed data packet to an output;
removing the identified active connection or sub-connection from the head of the macro-queue associated with the selected timestamp; and
appending again the identified connection or sub-connection to the tail of the same macro-queue only if the identified connection or sub-connection remains active after the packet has been removed.

25. The system of claim 24, wherein the selection of the timestamp identifying an active connection or sub-connection as the recipient of a service is based on a Smallest-Finishing-potential-First (SFF) timestamp selection policy, wherein a timestamp is selected when its value is minimum among all timestamps associated with non-empty macro-queues.

26. The system of claim 24, wherein the selection of the timestamp identifying an active connection or sub-connection as the recipient of a service is based on a Smallest-Eligible-Finishing-potential-First (SEFF) timestamp selection policy, wherein a timestamp is selected when its value is minimum among all timestamps being associated with non-empty macro-queues and not exceeding the system potential by more than a fixed amount, the amount being specific of each timestamp.

27. The system of claim 24, wherein the timestamp associated with a connection or sub-connection, generated each time the connection or sub-connection is queued to the respective macro-queue, is generated as a maximum value between a previous value of the timestamp assigned to the connection or sub-connection and a current value of the system potential, the maximum value incremented by the inverse of the data transfer rate associated with the macro-queue, if the connection or sub-connection is not active before being queued to the macro-queue.

28. The system of claim 24, further comprising:
means for activating a previously idle sub-connection for a connection whose data transfer rate does not match any of the available basic data transfer rates when a new packet is stored in the queue associated with the split connection and the number of packets currently stored in the queue is smaller than the total number of currently active sub-connections associated with the split connection, in which the activated sub-connection is identified as an active sub-connection; and
means for deactivating a previously active sub-connection for a connection whose data transfer rate does not match any of the available basic data transfer rates when a packet is transmitted to an output from the queue associated with the split connection and the number of packets remaining in the queue after the transmission is completed is smaller than the total number of currently active sub-connections associated with the split connection, in which the deactivated sub-connection is identified as an idle sub-connection.

29. A scheduler for processing a plurality of connections in a packet-processing system, each of the connections having an associated data transfer rate, the scheduler comprising:

a plurality of rate first-in-first-out (FIFO) queues for storing the connections;

a packet selector for servicing the connections; and a connection controller for performing the steps of:

responsive to receiving a request for establishing a new connection, determining whether the data transfer rate requested for the new connection matches one of a finite and discrete plurality of basic data transfer rates;

responsive to a match of the data transfer rate requested for the new connection with one of the available basic data transfer rates, associating the new connection with the matched basic data transfer rate;

responsive to a non-match of the data transfer rate requested for the new connection with any of the available basic data transfer rates, splitting the new connection into a plurality of sub-connections, the allocated rate of each of the sub-connections matching one of the basic data transfer rates, and associating each of the sub-connections with the respective matched basic data transfer rate;

responsive to receiving a plurality of data packets via a plurality of data links, identifying for each received data packet the respective one of the allocated connections and identifying the one of the queues associated with the connection;

storing each of the received data packets in the respective identified queue;

responsive to storing each received data packet in a queue associated with one of those connections whose data transfer rate matches one of the available basic data transfer rates, determning whether the connection was previously idle and must be activated, and identifying the connection as an active connection;

responsive to storing a received data packet in a queue associated with one of those connections whose data transfer rate dos not match any of the available basic data transfer rates, in which the connection is identified as a split connection, determining whether a previously idle sub-connection must be activated for the split connection, and identifying the sub-connection as an active sub-connection;

responsive to the activation of a previously idle sub-connection, treating the sub-connection as an independent entity for the purpose of service distribution, the service distribution being regulated by a scheduling method capable of supporting the finite and discrete plurality of basic data transfer rates;

scheduling the transmission of stored data packets on the available outputs according to the data transfer rates associated with respective ones of the allocated connections and sub-connections;

responsive to the transmission of a data packet from a queue associated with one of those connections whose data transfer rate matches one of the available basic data transfer rates to an output, determining whether the queue associated with the connection has at least one more packet waiting therein, in which the connection is identified as an active connection, or whether the queue associated with the connection has no packets waiting therein, in which the connection is identified as an idle connection; and responsive to the transmission of a data packet from a queue associated with one of those connections whose data transfer rate does not match any of the available basic data transfer rates to an output, updating the state of the packet queue associated with the allocated split connection, and determining whether one of the currently active sub-connections of the allocated split connection must be deactivated, in which the sub-connection is identified as an idle sub-connection.

30. The scheduler of claim 29, wherein the packet selector processes the queued connections and sub-connections using a per-connection-timestamp procedure.

31. The scheduler of claim 29, wherein the packet selector processes the queued connections and sub-connections using a no-per-connection-timestamp procedure.

* * * * *